US 11,349,841 B2

(12) United States Patent
Bowie et al.

(10) Patent No.: US 11,349,841 B2
(45) Date of Patent: May 31, 2022

(54) MANAGING USER ACCESS TO RESTRICTED CONTENT THROUGH INTELLIGENT CONTENT REDACTION

(71) Applicant: INTERNATIONAL BUSINESS MACHINES CORPORATION, Armonk, NY (US)

(72) Inventors: Dale Bowie, Benowa (AU); Jasmine Anne Smith, Southport (AU)

(73) Assignee: International Business Machines Corporation, Armonk, NY (US)

( * ) Notice: Subject to any disclaimer, the term of this patent is extended or adjusted under 35 U.S.C. 154(b) by 810 days.

(21) Appl. No.: 16/237,696

(22) Filed: Jan. 1, 2019

(65) Prior Publication Data
US 2020/0213319 A1 Jul. 2, 2020

(51) Int. Cl.
*H04L 9/40* (2022.01)
*H04L 12/18* (2006.01)
*G10L 15/26* (2006.01)

(52) U.S. Cl.
CPC ............ *H04L 63/101* (2013.01); *G10L 15/26* (2013.01); *H04L 12/1822* (2013.01); *H04L 63/0892* (2013.01); *H04L 2209/16* (2013.01)

(58) Field of Classification Search
CPC ... H04L 63/0245; H04L 63/08; H04L 63/083; H04L 63/0861; H04L 63/0892;
(Continued)

(56) References Cited

U.S. PATENT DOCUMENTS 8,117,036 B2 2/2012 Bedingfield, Sr.
8,289,366 B2 * 10/2012 Greenwood ............. H04N 7/15
348/14.08
(Continued)

OTHER PUBLICATIONS

"Toward Sensitive Information Redaction in a Collaborative Multilevel Security Environment" by Peter Gehres et al, published Jan. 2010 at "Proceedings of the 6th International Symposium on Wikis and Open Collaboration" in Gdansk Poland, found on the world wide web at: https://www.researchgate.net/publication/221367703_Toward_sensitive_information_redaction_in_a_collaborative_multilevel_security_environment.

*Primary Examiner* — Eric W Shepperd
(74) *Attorney, Agent, or Firm* — Stephanie L. Carusillo

(57) ABSTRACT

A method, system and/or computer usable program product for managing user access to restricted data including authenticating a set of users requesting attendance to a teleconference; obtaining content access rights associated with each of the authenticated users; converting and reviewing content of the teleconference in real-time to identify restricted data in the teleconference content; determining whether each of the authenticated users has content access rights to identified restricted data; upon determining at least one authenticated user does not have content access rights to the identified restricted data, redacting the identified restricted data in real-time from the teleconference content to generate a redacted teleconference content; and providing the teleconference content in real-time to each authenticated user with content access rights to the identified restricted data, and providing the redacted teleconference content in real-time to each authenticated user without content access rights to the identified restricted data.

20 Claims, 9 Drawing Sheets

(58) Field of Classification Search
CPC ... H04L 63/101; H04L 63/102; H04L 63/104; H04L 63/108; H04L 63/168; H04L 63/205; H04L 63/30; H04L 12/1822; H04L 65/403; H04L 2209/16; G10L 15/26
See application file for complete search history.

(56) References Cited

U.S. PATENT DOCUMENTS

| | | | | |
|---|---|---|---|---|
| 8,824,684 | B2* | 9/2014 | Calcaterra | H04L 9/0822 380/278 |
| 9,262,216 | B2* | 2/2016 | Bodik | G06F 9/4887 |
| 9,330,166 | B2 | 5/2016 | Deshpande et al. | |
| 9,684,798 | B2 | 6/2017 | Bhogal et al. | |
| 10,347,293 | B1* | 7/2019 | Skinner | G06F 40/30 |
| 10,540,521 | B2* | 1/2020 | Baracaldo Angel | H04L 63/0414 |
| 2005/0215260 | A1* | 9/2005 | Ahya | H04W 84/02 455/452.2 |
| 2007/0100533 | A1 | 5/2007 | Jung et al. | |
| 2007/0234365 | A1* | 10/2007 | Savit | G06F 9/505 718/104 |
| 2008/0063173 | A1* | 3/2008 | Sarkar | H04M 3/56 379/202.01 |
| 2008/0192736 | A1* | 8/2008 | Jabri | G11B 27/34 370/352 |
| 2009/0025063 | A1 | 1/2009 | Thomas | |
| 2009/0147958 | A1* | 6/2009 | Calcaterra | H04L 9/0833 380/260 |
| 2012/0163577 | A1* | 6/2012 | Buford | H04L 12/1822 379/202.01 |
| 2012/0321062 | A1* | 12/2012 | Fitzsimmons | H04L 65/403 379/142.17 |
| 2013/0007123 | A1* | 1/2013 | Crosbie | H04L 63/107 709/204 |
| 2013/0144603 | A1* | 6/2013 | Lord | G06F 40/58 704/9 |
| 2013/0266127 | A1 | 10/2013 | Schachter et al. | |
| 2015/0043572 | A1* | 2/2015 | Charugundla | H04M 1/2475 370/352 |
| 2015/0195406 | A1 | 7/2015 | Dwyer et al. | |
| 2016/0378999 | A1 | 12/2016 | Panchapakesan et al. | |
| 2017/0076713 | A1* | 3/2017 | Gildein, II | H04N 7/15 |
| 2019/0341050 | A1* | 11/2019 | Diamant | H04N 7/155 |
| 2021/0076107 | A1* | 3/2021 | Quek | H04N 5/278 |

* cited by examiner

FIG. 6A

USER RECORD *600*

| USER ID 602 | NAME 604 | ACCESS RIGHTS 606 | ORGANIZATION 608 | POSITION 610 | OTHER 612 |
|---|---|---|---|---|---|

FIG. 6B

TELECONFERENCE TYPE RECORD *620*

| TYPE ID 622 | DESCRIPTION 624 | RESOURCES 626 | TEMPLATES 628 |
|---|---|---|---|

TELECONFERENCE TEMPLATE RECORD *630*

| TEMPLATE ID 632 | DESCRIPTION 634 | ORGANIZATION 636 | POSITION 638 | SPECIFIC 640 | OTHER 642 |
|---|---|---|---|---|---|

FIG. 6C

TELECONFERENCE RESERVATION RECORD *650*

| DATE 652 | TIME 654 | ATTENDEES 656 | TYPE 658 | TEMPLATE 660 | OTHER 662 |
|---|---|---|---|---|---|

FIG. 6D

RESTRICTED CLASSIFICATION DATA RECORD *670*

| ITEM/CATEGORY 672 | RULES 674 | RESTRICTED CLASSIFICATION 676 | SUBSTITUTE 678 |
|---|---|---|---|

MANAGING USER ACCESS TO RESTRICTED CONTENT THROUGH INTELLIGENT CONTENT REDACTION

BACKGROUND

Technical Field

The present invention relates generally to managing user access to data, and more specifically to a computer implemented method for managing user access to restricted data through intelligent content redaction.

Description of Related Art

With the advent of modern telecommunications, people have conducted various types of live teleconferences in lieu of meeting face to face. This reduces travel costs and time and promotes rapid and effective communications. These teleconferences include audio and video teleconferences, including sharing various types of multimedia such as documents, audio, video and computer audio and display output. Recent advances in telecommunications as well as audio, video and telerobotic equipment now allow for telepresence teleconferences whereby people in other locations appear to be present in the same location.

These live teleconferences can simultaneously include multiple people from locations across the world sharing information concurrently. This allows for the rapid sharing and dissemination of information as well as long distance collaboration among multiple people across multiple locations. This can include people within a common organization as well as across multiple organizations. These live teleconferences can also be recorded and played back later in remote locations allowing others to obtain the information from the teleconference without requiring live attendance. As a result of these live and recorded teleconferences, improved communications can occur between people throughout and across multiple organizational boundaries, creating value for those involved directly or indirectly.

SUMMARY

The illustrative embodiments of the present invention provide a method, system, and/or computer usable program product for managing user access to restricted data including authenticating a set of users requesting attendance to a teleconference; obtaining content access rights associated with each of the authenticated users; converting and reviewing content of the teleconference in real-time to identify restricted data in the teleconference content; determining whether each of the authenticated users has content access rights to identified restricted data; upon determining at least one authenticated user does not have content access rights to the identified restricted data, redacting the identified restricted data in real-time from the teleconference content to generate a redacted teleconference content; and providing the teleconference content in real-time to each authenticated user with content access rights to the identified restricted data, and providing the redacted teleconference content in real-time to each authenticated user without content access rights to the identified restricted data.

BRIEF DESCRIPTION OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIGS. 6A-6D provide block diagrams of data structures utilized for managing user access to restricted data in accordance with a second embodiment of the present disclosure;

DETAILED DESCRIPTION

Processes and devices may be implemented and utilized for managing user access to restricted data through intelligent content redaction. These processes and apparatuses may be implemented and utilized as will be explained with reference to the various embodiments below.

Figure 1:
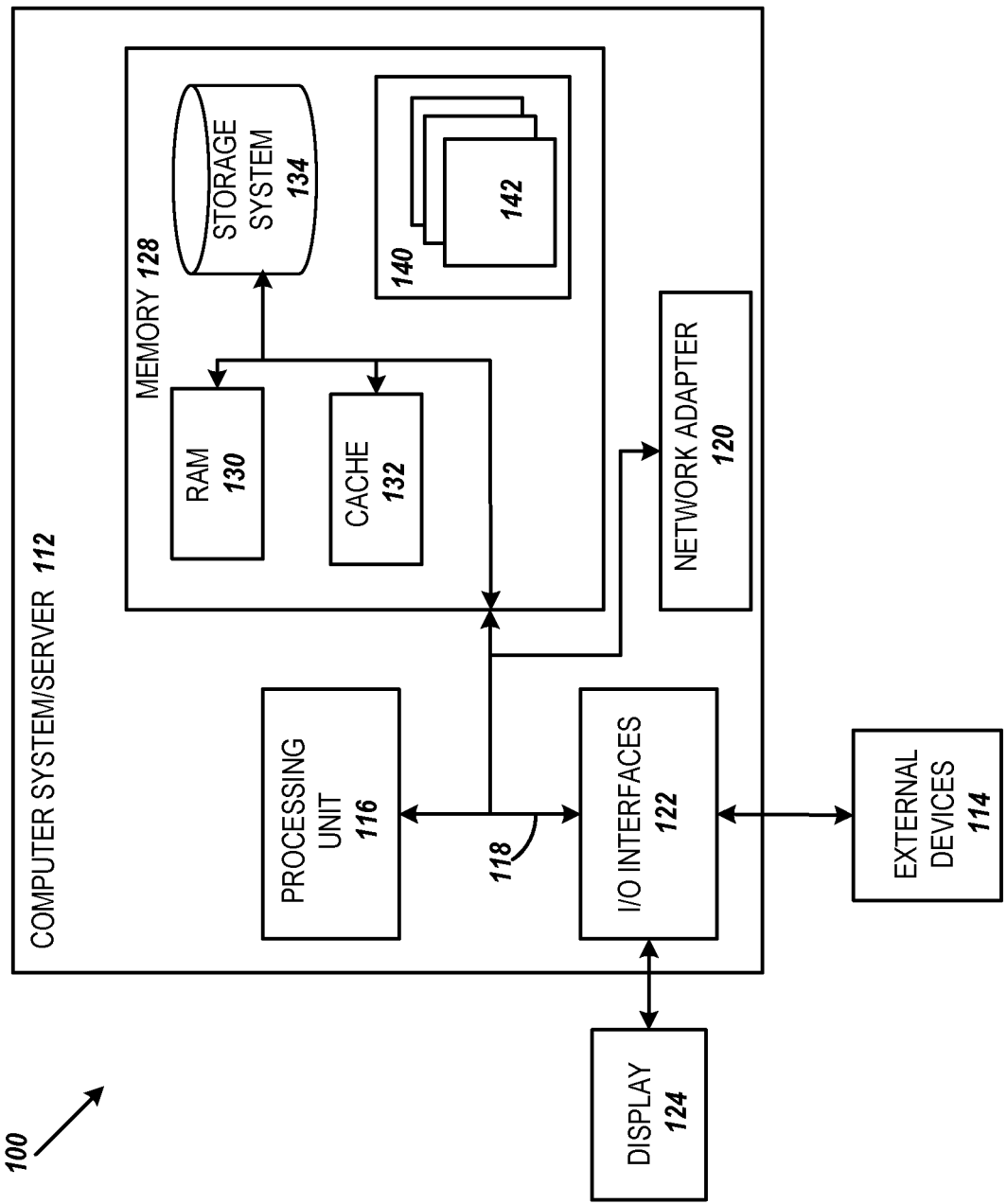
FIG. 1 provides a block diagram of an illustrative data processing system in which various embodiments of the present disclosure may be implemented.

FIG. 1 provides a block diagram of an illustrative data processing system in which various embodiments of the present disclosure may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein such as managing user access to restricted data through intelligent content redaction.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-performable instructions, such as program modules, being processed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of non-transitory computer system usable media. Such media may be any available media that is accessible by computer system/server 112, and it includes both volatile and non-volatile media, removable and non-removable media.

System memory 128 can include non-transitory computer system readable media in the form of volatile memory, such as random access memory (RAM) 130 and/or cache memory 132. Computer system/server 112 may further include other non-transitory removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for managing user access to restricted data through intelligent content redaction.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
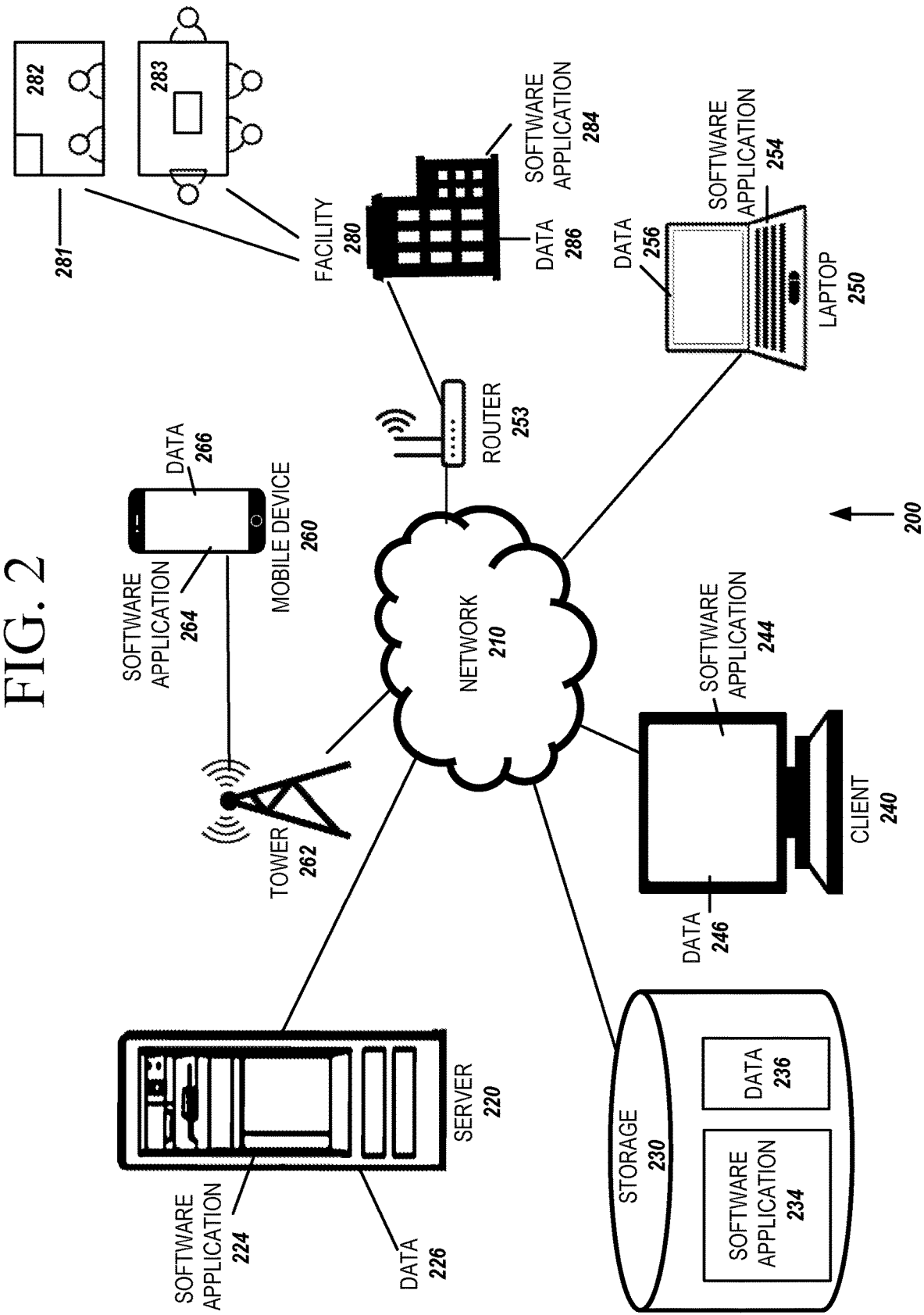
FIG. 2 provides a block diagram of an illustrative network of data processing systems in which various embodiments of the present disclosure may be implemented.

FIG. 2 provides a block diagram of an illustrative network of data processing systems in which various embodiments of the present disclosure may be implemented. Various types of live conferencing as well as playback of recorded teleconferences can be conducted across multiple locations utilizing these data processing systems. A teleconference is a conference with participants or users in different locations linked by telecommunication devices in real-time. This can include many types of teleconferences such as a group or team meeting across multiple locations, a one on one meeting with another person such as a manager, a meeting with other outside of an organization including the general public, a non-disclosure based meeting with a customer or other entity, etc. Different locations can simply be different devices that are viewed independently by different persons even though they are closely proximate to each other. Teleconferences can include audio, video and multimedia content shared across multiple locations. Data processing environment 200 is a network of data processing systems such as described above with reference to FIG. 1. Software applications such as for managing user access to restricted data through intelligent content redaction may be processed on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile device 260 such as a mobile phone may be coupled to network 210 through a cell tower 262. Data processing systems, such as server 220, client 240, laptop 250, mobile device 260 and facility 280 contain data and have software applications including software tools processing thereon. Other types of data processing systems such as personal digital assistants (PDAs), smartphones, tablets and netbooks may be coupled to network 210.

Server 220 may include software application 224 and data 226 for managing user access to restricted data through intelligent content redaction or other software applications and data in accordance with embodiments described herein. Storage 230 may contain software application 234 and a content source such as data 236 for managing user access to restricted data through intelligent content redaction. Other software and content may be stored on storage 230 for sharing among various computer or other data processing devices. Client 240 may include software application 244 and data 246. Laptop 250 and mobile device 260 may also include software applications 254 and 264 and data 256 and 266.

Facility 280 can include a video teleconference or telepresence room 281 including one or more displays 282 and local desk, data processing equipment and persons 283. Display 282 can include a live video feed of other persons attending the video teleconference remotely as well as for providing shared multimedia. Local data processing equipment 282 may also include data processing equipment for providing shared multimedia. Facility 280 may include software applications 284 and data 286 on local data processing equipment. Other types of data processing systems coupled to network 210 may also include software applications. Software applications could include a web browser, email, or other software application for managing user access to restricted data through intelligent content redaction.

Server 220, storage unit 230, client 240, laptop 250, mobile device 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile device 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3A:
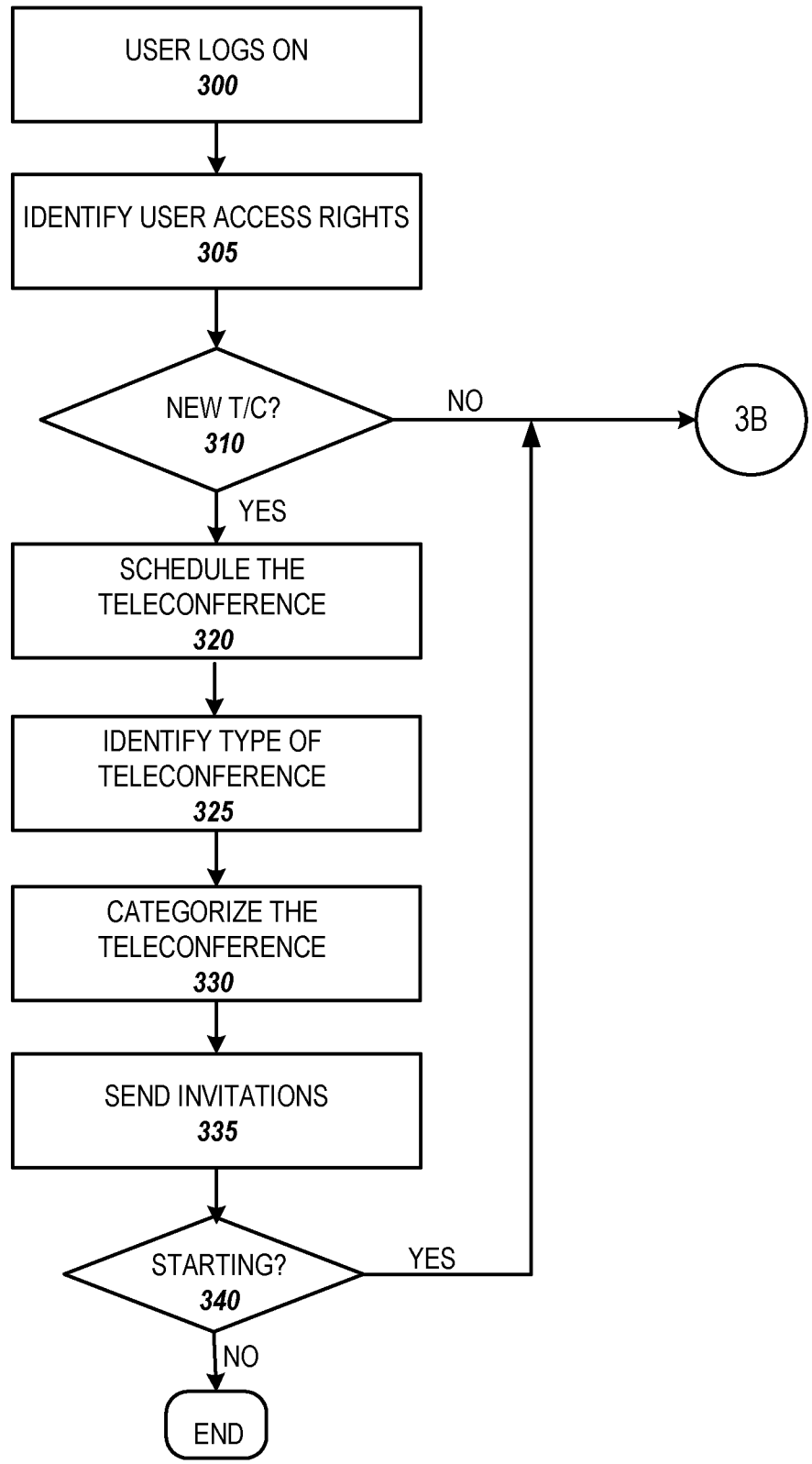
FIGS. 3A-3B provide a high level flow diagram of managing a teleconference, including managing user access to restricted data through intelligent content redaction, in which various embodiments of the present disclosure may be implemented.
Figure 3B:
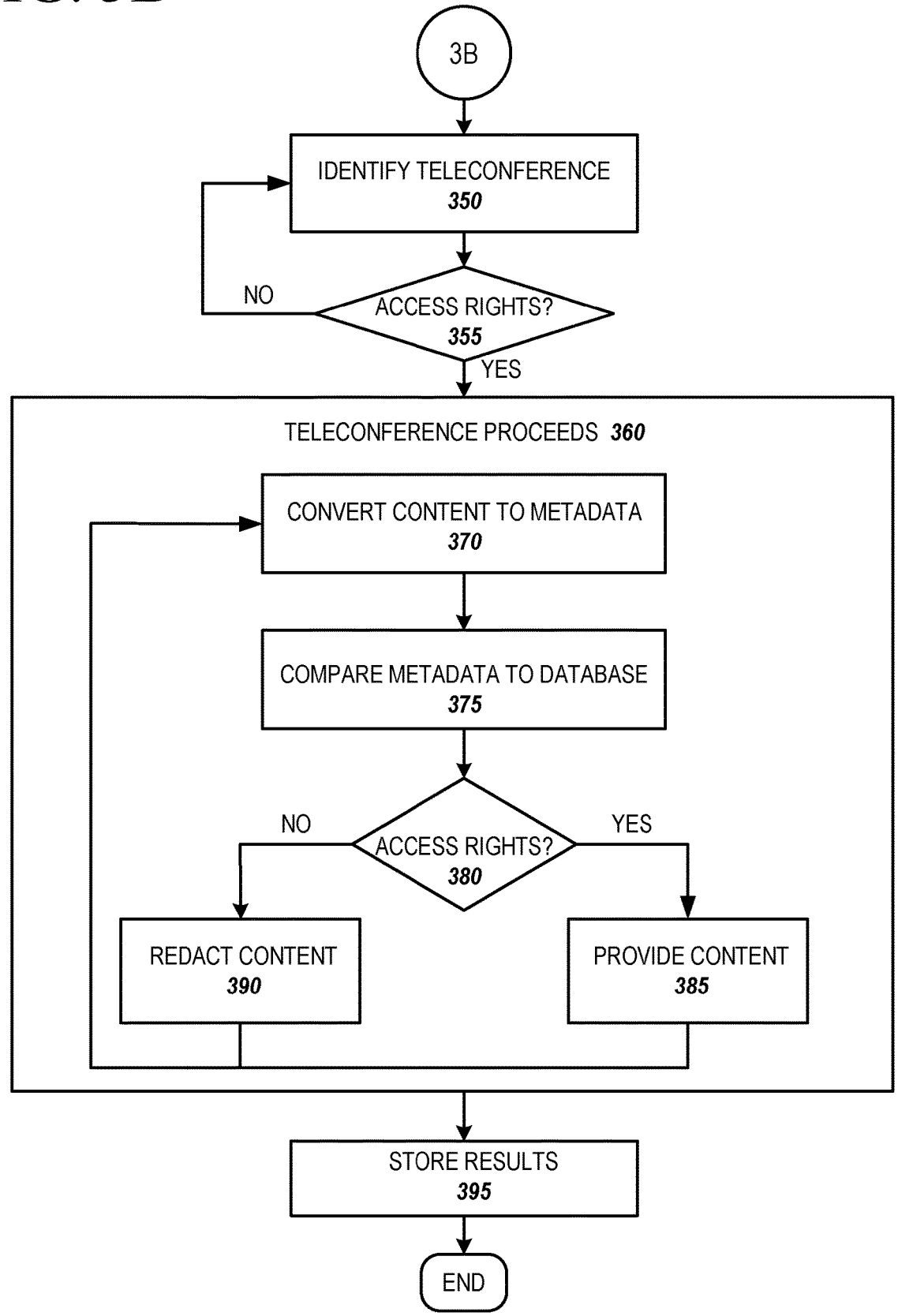

FIGS. 3A-3B provide a high level flow diagram of managing a teleconference, including managing user access to restricted data through intelligent content redaction, in which various embodiments of the present disclosure may be implemented. This includes selectively redacting content for each teleconference user based on that user's access rights. A user can be an attendee, participant, presenter or other person accessing a teleconference. A user at a live teleconference conducted in real-time can be also referred to herein as a participant. A user can be a presenter, an attendee or both. A teleconference can include audio, visual and multimedia content. Multimedia content can include computer generated or provided content for audio and/or visual display.

In a first step 300, a user logs onto a teleconference system which manages teleconferences. That is, the user accesses the teleconference system and is authenticated as a user with that system. The teleconference system can be accessed through an app on a mobile device, a software application on a local server accessible through a local network, a webpage on an internet website, or other secure method for accessing the teleconference application. The user can be authenticated through the use of a login identifier and password, through biometrics such as voice and/or facial recognition, through the sharing of digital certificates by a system or software the user already has authorized access to, etc. Optionally, two step authentication may be utilized including but not limited to sending a text or email to previously known phone number or email address to the user for entry by that user. Once a user accesses the teleconferencing system the user may logoff that system at any time in the process described below. The current state of the user's access, including any teleconference event the user is originating, may be retained for the next time the user logs onto the teleconferencing system.

Then in step 305, the teleconferencing system identifies the access rights (also referred to herein as authenticated credentials) that the user has with regards to originating and accessing teleconferences. Some users may have limited access rights and cannot originated teleconference events or may only access certain teleconference events. In step 310, the user indicates whether that user is originating a new teleconference (abbreviated as T/C in the drawings) event or not. For example, the user may be attempting to generate a new teleconference event for the present or future, or the user may be accessing an existing teleconference event which may be about to start, ongoing, or even previously recorded. If the user indicates that a new teleconference event is being generated and if the user has the appropriate access rights to do so, then processing continues to step 320, otherwise processing continues to step 350.

In step 320, the user originating the teleconference event (referred to herein as an originating user) schedules the teleconference including providing the time and date of the teleconference event, the possible number of attendees, and other relevant information needed for scheduling the teleconference event such as scheduling certain conference rooms for the teleconference event as well as scheduling computing resources needed for managing the teleconference. The computing resources for managing the teleconference can include transmission, memory and processing resources for converting the teleconference content to a reviewable form such as text, reviewing the teleconference content for restricted data, determining whether any of the authenticated users does not have the necessary access rights to hear or view the restricted data, redacting the restricted data from the teleconference content, and providing either the original teleconference content or the redacted teleconference content to the appropriate users based on their access rights. The originating user can also identify whether he or she is doing scheduling the teleconference event on behalf of another user, which can affect the access rights the originating user has to schedule the teleconference. The organizing user can also provide a list of possible attendees for the scheduled teleconference. This can be a precise list of identified individuals or a general list of types or classes of individuals that can attend. Processing then continues to step 325 and 330.

In step 325, the originating user identifies the type of teleconference. The teleconference may be more hierarchical with a presenter sharing a multimedia presentation and the participants may be limited to questions, or the teleconference may be more collaborative with multiple users providing multimedia or even accessing, annotating or modifying another user's multimedia presentation through collaborative software. Many types of teleconference events can be created for the type of teleconference needed for a given purpose. The originating user may be limited in the type of teleconference events he or she can identify based on the user's authenticated credentials. This step may be performed before step 325, especially if it may affect scheduling the location types needed for holding teleconference.

Then in step 330, the originating user categorizes the teleconference. That is, different teleconferences may have different restricted classifications (including levels of confidentiality). For example, a teleconference regarding an unannounced product may contain more restricted information than a teleconference regarding an announced product. With a higher level of restricted classification, a more restricted redaction filter may be utilized for that teleconference event such that a greater level of redaction may be utilized for many users unless they have a high level of access rights. Other types of categorization may be utilized as described below. For example, the originating user may identify a redaction template to be utilized for that teleconference. That is, different types of teleconference events may have different redaction templates utilized for limiting access to the teleconference event or to certain information exchanged in that event. For example, a teleconference for an unannounced product may be limited to organization personnel only or may be limited to personnel from certain other organizations that have signed appropriate non-disclosure agreements. This step may also be performed before step 325, especially if it may affect which attendees may be requested to attend the teleconference.

Then in step 335, a set of invitations may be emailed, texted or otherwise sent to possible attendees of the scheduled teleconference. The invitations may be sent to specific attendees or a general invitation may be sent to a type or class of possible attendees identified in step 320 above. The invitations can include calendaring capabilities for insertion into the attendee's calendars. Subsequently in step 340, it is determined whether the schedule teleconference is about to start or not. That is, the user originating the teleconference event may be doing so at the time the teleconference begins. If yes in step 340, then processing continues to step 350, otherwise processing ceases.

In step 350, the user identifies which teleconference event the user wishes to participate with. This can be done by the user providing a teleconference identifier from a teleconference event invitation, from a pull down menu of teleconference events the user is authorized to participate in, or other indication. Then in step 355, the teleconferencing system reviews the user's credentials identified above to determine whether the user has authorized access to the teleconference and the extent of the user's access rights. This can be performed for an originating user as well, particularly if the originating user scheduled the teleconference event on behalf of another user. If the user does not have access rights to attend the requested teleconference, then processing returns to step 350, otherwise processing continues to step 360. These steps are repeated for each user that requests access to the teleconference. In addition, if two users are granted access at the same location (i.e., viewing the same display, hearing the same audio, etc.), then the access rights are automatically set to the lower access rights of the users at that location unless an authorized person indicates otherwise. Facial and voice recognition may also be utilized to verify that all participants are properly logged into the teleconferencing system. For example, an unidentified person may be spotted at a given location, necessitating an inquiry to the logged in user at that location regarding the unidentified person.

The teleconference then proceeds in step 360 as scheduled. As the teleconference proceeds, the content provided by each user is then monitored by the teleconferencing system in steps 370-390. This can include timestamping the teleconference content as it is generated. This includes converting conversation to metadata, such as text through natural language processing of audio, to provide searchable information about speech, images and presentations for identifiable elements and language, etc. in step 370. The converted voice, text and images to metadata are then compared to a database of potentially restricted matter or topics in step 375. This comparison can be performed according to a set of rules set forth for each restricted matter or topic as well as for the teleconference. If some teleconference content is identified as potentially restricted, then in step 380 the access rights of each user in the teleconference is checked to determine whether that user has access to the identified potentially restricted content. If yes, then no redaction action is performed and the content is provided to the user in step 385. However, if no, then in step 390 the potentially restricted content is redacted for that user without the access rights to that content. This can include some surrounding content that could possibly be related to the restricted content. Redaction can be performed through various techniques such as muting restricted audio, blacking out or making invisible restricted images, etc. If certain speech is redacted, then the mouth area of the speaker may also be redacted through a form of masking or blurring. The user may be provided all content not redacted.

Steps 370-390 of step 360 are repeated continuously throughout the teleconference until the teleconference ends. Please note that multiple redacted feeds may be provided based on the access rights of the users at each location. As a result, each location can receive a different set of redacted content based on the users and their access rights at that location. In addition, as the teleconference content and redacted teleconference content is provided to the appropriate authenticated users, the timestamp provided earlier can be compared to the current time to determine whether the process described herein is occurring in real-time. If not or if it is close, then additional computing resources can be allocated to the teleconference to provide a real-time experience to the attendees. A maximum delay for real-time can be user configured and set forth in a teleconference reservation or template, typically from a 1 to 3 second delay. The results of the teleconference, including which portions were redacted for which individual is then stored in step 395 for possible future analysis to improve the restricted content monitoring and redaction process. Processing then ceases until another teleconference is scheduled as described above.

Figure 4:
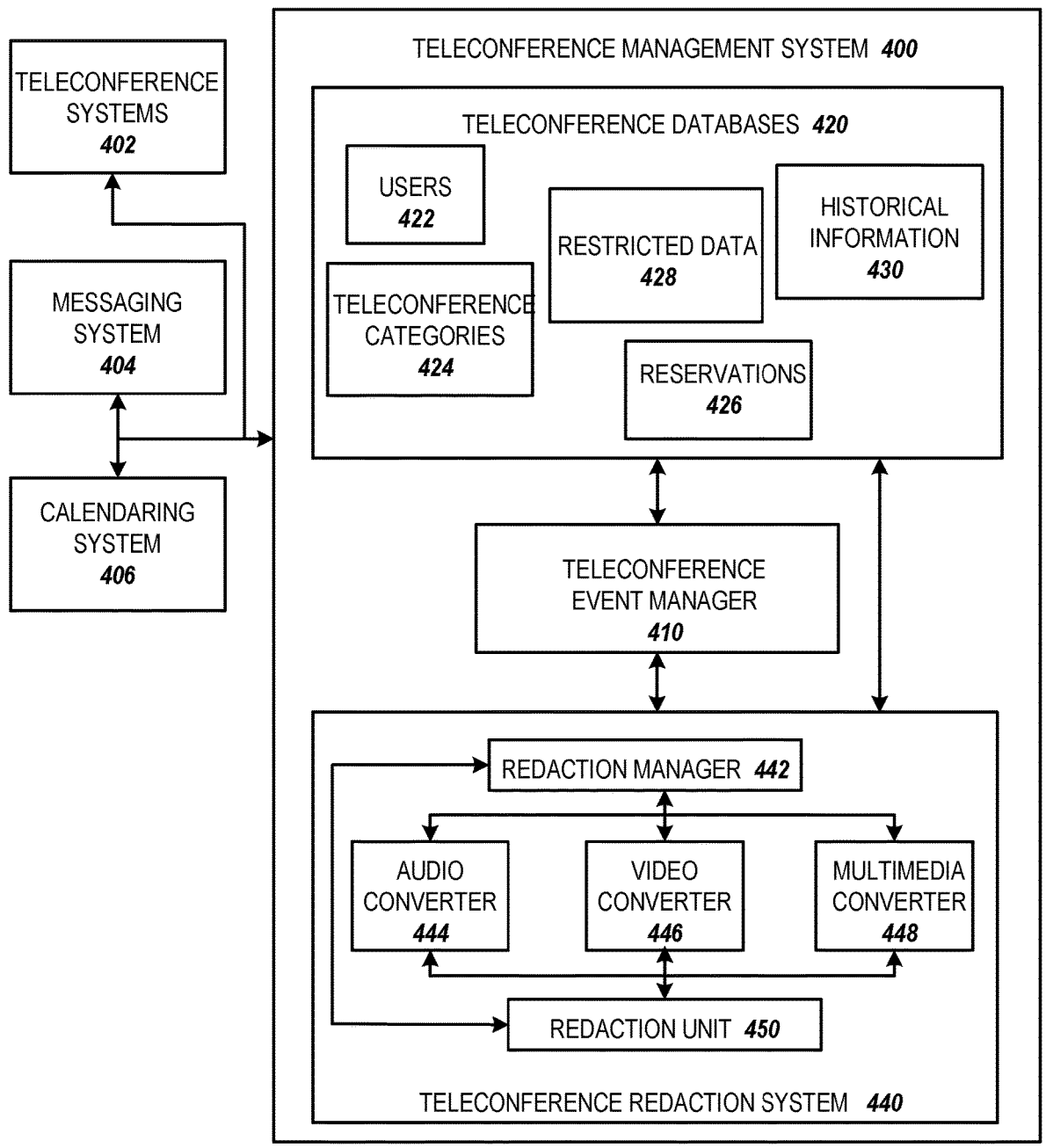
FIG. 4 provides a high level block diagram of a teleconference management system in which various embodiments of the present disclosure may be implemented.

FIG. 4 provides a high level block diagram of a teleconference management system in which various embodiments of the present disclosure may be implemented. Teleconference management system 400 interacts with other systems including teleconference systems 402, messaging system 404 and calendaring system 406. Teleconference systems 402 may include the local hardware and software for performing teleconferences including teleconference rooms as well as local and mobile devices which users may utilize in conducting a teleconference. Teleconference systems 402 can also provide a live feed of a teleconference event in real-time to teleconference management system 400 for processing as described below. Messaging system 404 may be an email system for use in communicating with possible users to teleconference management system 400. Messaging system 404 may also include other forms of communications with users including texts to mobile devices. Calendaring system 406 may be utilized to schedule teleconferences including working with the users through messaging system 404 for reserving appropriate teleconference rooms including local hardware and software of teleconference systems 402. Although teleconferencing management system is shown separately from teleconference systems 402, messaging system 404 and calendaring system 406, any of all of these systems may be incorporated, loosely or tightly, with teleconference management system 400. That is, alternative embodiments may be configured as appropriate for a given implementation of the embodiments described herein.

Teleconference management system 400 may be stored in a central storage location such as storage 230, on a central server such as server 220 or facility 280, or elsewhere it can be utilized as needed for handling a teleconference event. Teleconference management system 400 may be utilized for handling a teleconference event from a central server such as server 220 or facility 280 or elsewhere it can access a feed of the teleconference in a timely manner. One or more copies of teleconference management system 400 may be downloaded to a local system such as client 240, laptop 250, mobile device 260, or elsewhere as needed. That is, one or more copies may be stored in multiple locations for processing a local portion of a teleconference event whereby the copies process the part of the teleconference originating in that location. Teleconference management system 400 may also be stored in a cloud environment, possibly with a local instance downloaded at each location where the teleconference occurs. This type of parallel local processing can be useful for processing the teleconference content in a timely manner.

Teleconference management system 400 includes a teleconference event manager 410, a set of teleconference databases 420 and a teleconference redaction system 440. While teleconference event manager 410 can assist in the process of scheduling a teleconference event, it mainly manages the teleconference event as it occurs including the live review and redaction of restricted information (including confidential information) in real-time to authorized participants of a teleconference. Restricted information can be any information to which access may be controlled for certain users. In this embodiment, this access is controlled through the use of a restricted classification of content and an access rights of users. Teleconference event manager 410 coordinates the activities of teleconference redaction system 440 with teleconference databases 420, such as with a live feed of a teleconference from teleconference systems 402. Teleconference event manager 410 can also coordinate activities such as scheduling and messaging with between teleconference management system 400, teleconferencing systems 402, messaging system 404 and calendaring system 406.

Teleconference databases 420 includes several databases useful for performing the various activities described herein including users 422, teleconference categories 424, reservations 426, restricted data 428 and historical information 430. Users database 422 includes a list of users that can access teleconferences including their access rights to those teleconferences and other relevant information about those users. Much of this information could be located in other databases within an organization with linkages to teleconference management system 400. Teleconference categories database 424 includes various categories that teleconferences can be identified by an originating or other user such as a restricted classification, redaction templates or other categorizations as described below. Reservations database 426 can include a list of scheduled teleconference events including the time, location(s), teleconference type, teleconference category(ies), authorized users, etc. This information can also be stored externally with linkages to teleconference management system 400. Restricted data 428 includes a list or categories of information which can be deemed restricted (including confidential information) and which may be redacted for some users. This can include synonyms and other similar items or categories which may also be deemed restricted. Examples of restricted information, some of which may be confidential, include customer names, personally identifiable information such as social security or other identifier numbers, HIPPA (Health Insurance Portability and Accountability Act) information, GDPR (General Data Protection Regulation) restricted data, items identified as restricted or confidential in the teleconference, etc. Confidential data is restricted data which needs to be kept confidential for legal or business strategic purposes. In addition to storing restricted data, a list or categories of information which are deemed not restricted may also be included to provide examples of items or categories that are not to be redacted. Furthermore, non-restricted substitutions may also be stored in the database for use in substituting for restricted data as part of a redaction process, such as described with reference to the second embodiment below. Historical information database 430 includes historical data which may be useful for later analysis to improve the redaction process described herein. For example, all items redacted for certain users may be stored for further analysis to determine whether those items should not have been redacted for those users. In addition, some or all items not redacted for certain users may also be stored for further analysis to determine whether those items should have been redacted for those users. Furthermore, certain items may be flagged by a user, either before during or after a teleconference as needing further analysis after the teleconference. For example, a user may realize that certain information should not have been disclosed to another user in the same teleconference room and flag that information for further post-teleconference analysis. Additional teleconference databases may be included or the described databases may be organized differently in alternative implementations of the present invention.

Teleconference redaction system 440 manages the redaction of content in a teleconference, typically in real-time of a live feed of the teleconference from teleconference systems 402, while using minimal buffering so as to not interfere with the interaction of the participants. Teleconference redaction system 440 includes redaction manager 442, audio converter 444, video converter 446, multimedia converter 448 and redaction unit 450. Additional content converters may be utilized as needed to convert content for analysis and possible redaction. Redaction manager 442 manages the redaction process including coordinating the actions of the various elements of teleconference redaction system 440. Redaction manager 442 can receive the live feed of the teleconference and manage the content redaction in a reasonable amount of time (i.e., real-time) to avoid disrupting the teleconference. This can include timestamping the live teleconference feed and then comparing that to the time the redacted or unredacted teleconference content is provided for presentation to the users. If this time exceeds a desired maximum for either redacted or unredacted teleconference content, then additional processing resources can be applied to processing the teleconference feed. Audio converter 444 converts audio content from natural language to metadata such as text. Various types of speech recognition systems are available today that are useful for this purpose. Other types of audio content may also be recognized and identified for possible redaction including songs to metadata. Audio converter 444 then passes this converted content, text and other identified content as metadata, to redaction unit 450 for a determination whether to redact any of this converted content. Audio converter 444 can also mute or otherwise remove selected audio content as instructed by redaction unit 450. Video converter 446 converts video content to metadata such as text or as an identification of a known image or face. Various types of optical recognition systems are available today that are useful for this purpose. Other types of video content may also be recognized and identified for possible redaction besides observable text including facial recognition, object recognition, etc. Video converter 446 then passes this converted content, text and other identified content as metadata, to redaction unit 450 for a determination whether to redact any of this converted content. Video converter 446 can also hide or otherwise remove selected video content as instructed by redaction unit 450. Multimedia converter 448 converts multimedia content from multimedia content (e.g., a presentation, a website, etc.) to metadata such as text. Various types of optical and content (e.g., website) recognition systems are available today that are useful for this purpose. Other types of multimedia content may also be recognized and identified for possible redaction including faces, objects, songs, etc. To the extent that multimedia content includes audio content, that content may be sent to audio converter 444 for processing. Multimedia converter 448 then passes this converted content, text and other identified content as metadata, to redaction unit 450 for a determination whether to redact any of this converted content. Multimedia converter 448 can also hide or otherwise remove selected multimedia content as instructed by redaction unit 450.

Redaction unit 450 then determines which content needs to be redacted based on data identified as restricted in restricted data database 408 and user access rights from users database 422. Redaction unit 450 utilizes restricted data database 428 to identify restricted data within the content. Redaction unit 450 also identifies content related to or proximate to restricted content which may be also restricted by association. For example, if a user utilizes a restricted word in describing a page of multimedia content, that multimedia content may also include information which is restricted. Redaction unit 450 makes these associations among and across content that is audio, visual and multimedia based. If restricted content is identified, then each participant's credentials are checked to see if that user has the appropriate access rights to the restricted content. If not, then that content is redaction in the teleconference feed to that user such as the speaker and display that user is utilizing to receive the content from the teleconference. This redaction can be across multiple types of content. For example, if certain speech is redacted, then the mouth area of the speaker may also be redacted through a form of masking or blurring. Redaction unit 450 instructs audio converter 444, video converter 446 and multimedia converter 448 to redact the restricted content from the teleconference feed to the user without access rights to that restricted content.

Figure 5:
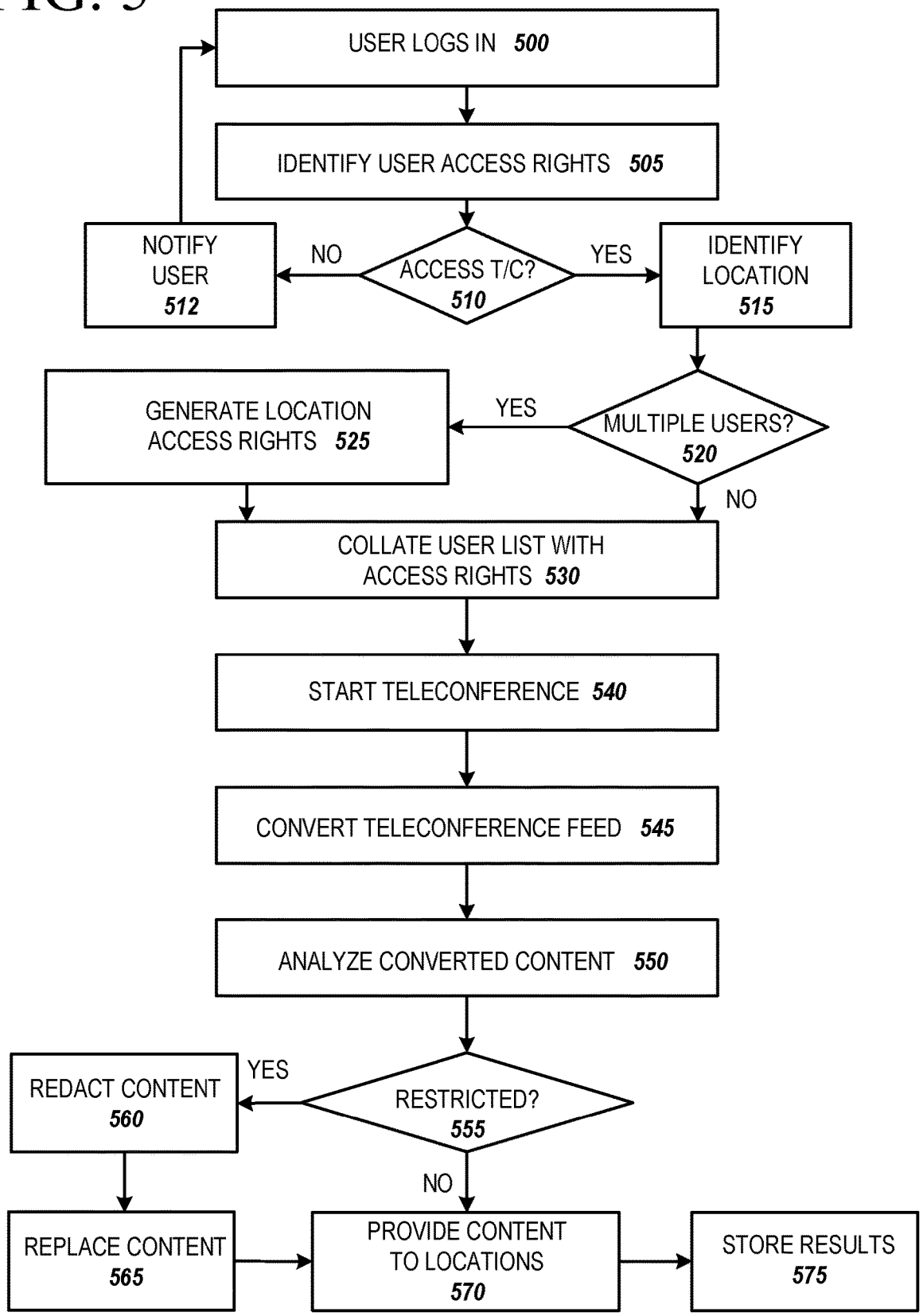
FIG. 5 provides a flow diagram of managing user access to restricted data through intelligent content redaction in accordance with a first embodiment of the present disclosure.

FIG. 5 provides a flow diagram of managing user access to restricted data through intelligent content redaction in accordance with a first embodiment of the present disclosure. In this first embodiment, content elements may be categorized with a restricted classification to determine whether a user has the necessary access rights to receive that restricted content. This presumes the teleconference event had previously been scheduled or just been set up for multiple users to join such as described in FIG. 3A above. In this embodiment, each user has a low, medium or high level of access rights and each teleconference event is ranked as having low medium or high level of restriction.

In a first step 500, a user logs onto a requested teleconference through a teleconference system such as teleconference management system 400 in communication with teleconference systems 402. That is, the user accesses the teleconference system and is authenticated as a user with that system. The teleconference system can be accessed through an app on a mobile device, a software application on a local server accessible through a local network, a webpage on an internet website, or other secure method for accessing the teleconference application. The user can be authenticated through the use of a login identifier and password, through biometrics such as voice and/or facial recognition, through the sharing of digital certificates by a system or software the user already has authorized access to, from a teleconference event calendar request that identifies the user from a secure system, etc. Optionally, two step authentication may be utilized including sending a text or email to previously known phone number or email address to the user for entry by that user. Once a user accesses the teleconferencing system the user may logoff that system at any time in the process described below. The current state of the user's access, including any teleconference event the user is originating, may be retained for the next time the user logs onto the teleconferencing system. If the user is originating a teleconference, then that process can be implemented similar to FIG. 3A above, otherwise processing continues to step 705.

Then in step 505, the teleconferencing system identifies the access rights (also referred to herein as authenticated credentials) that the user has with regards to originating and accessing teleconferences. Some users may have limited access rights and may only access certain teleconference events or may have certain restricted content redacted from the teleconference content provided to that user. In step 510, a determination is made whether the user has the necessary credentials (i.e., access rights) to access the requested teleconference. For example, the user may have a low level of access sights and the teleconference may have a medium level of restriction (e.g., medium level of confidentiality) and be limited to those who have a medium or high access rights, such that the user with low access rights may not be authorized to access the teleconference. However, if a user with a high level of access rights specifically invites the user with low access rights, this limitation may be overridden, depending on how the system is configured and implemented. If the user does not have the necessary access rights, then the user is notified of this fact in step 512 and processing returns to step 500. The user can then request access to the teleconference through other channels or attempt to log onto another teleconference. It is possible that the user simply attempted to log onto the wrong teleconference. If yes in step 510, the user has the necessary credentials to access the teleconference (abbreviated as T/C in the drawings), then processing proceeds to step 515.

In step 515, it is determined which location the user is accessing the teleconference. This can be a specific location such as a specific local teleconference room, or it can be a specific device such as a desktop computer or even a mobile device such as a cell phone. Then in step 520, it is determined whether any other persons are also accessing the teleconference from the same location. This can be accomplished through the log in process, or it can be determined through facial recognition of a video feed or even of voice recognition of an audio feed. If yes in step 520, then processing continues to step 525, otherwise to step 530. In step 525, the access rights of each user at that location are compared and a working set of access rights are generated for all users at that location. As described above, typically the lowest access rights can be utilized as a default, although some users may have the necessary access rights to modify this approach. For example, one user at a given location may have a high level of access rights and another user at that same location may have medium level of access rights, resulting in a medium level of access at that location. As a result, the working set of access rights for a location are utilized for redacting restricted content from the teleconference content as the teleconference proceeds. Processing then continues from step 525 to step 530. As described above, if no in step 520, then processing continues directly to step 530. In step 530, a list of participants is generated, supplemented or otherwise collated for the teleconference including the access rights of each location where the teleconference content is generated and provided. Processing then continues to step 540. Steps 500-530 can be repeated for each user that logs onto the teleconference and can continue even after the teleconference starts in step 540.

In step 540, the teleconference starts with a teleconference feed (i.e., teleconference content in the form of audio, visual and multimedia form) from each location that provides content to the teleconference. For example, three teleconference locations may be included with two locations providing content and the third location simply receiving content but not providing any content. The various teleconference feeds can be continuously or periodically timestamped at this as the content is provided or otherwise captured. In step 545, the teleconference feed from each providing location is then converted for analysis by the teleconference redaction system, such as teleconference redaction system 440 described above. A redaction manager will split the teleconference feed from each providing location into one or more components for conversion to a useful form for determining whether any restricted content is included in that teleconference feed. For example, audio may be converted to metadata such as text through a natural language speech recognition system, a video may also be converted to identify and convert to metadata any written materials in that video feed, and multimedia may be converted to metadata through optical character recognition or other systems. Additional conversions may also be utilized such as song recognition, facial recognition, and other relevant conversions for identifying potentially restricted content such as that identified in restricted data database 428.

Then in step 550, the converted content is analyzed for restricted data. That is, the converted split content is compared against a database of restricted data items and categories according to a set of rules as described herein. This analysis can be conducted with a straight comparison of data against the database, or artificial intelligence or other simple or sophisticated matching analytical system may be utilized including the use of statistical and probability analysis. This matching system can be trainable over time to better recognize restricted content through various techniques such as reviewing prior redacted teleconferences in historical information database. This can include the identified restricted content as well as any related content identified as possibly restricted as well. Such a determination can utilize artificial intelligence, or other simple or sophisticated matching analytical system may be utilized including the use of statistical and probability analysis. In addition, if a person in the teleconference identifies content as restricted or highly restricted, or is a document or other multimedia item identifies content as restricted, then that is also treated as restricted content. Any identified restricted content is then checked for the restricted classification as previously identified such as in restricted data database 428. In the case of content identified as restricted within the teleconference feed, the restricted classification may also be discerned from the source or assumptions may be made based on how the system is configured. For example, the content identified as restricted within the teleconference feed may be automatically given a low level of restricted classification unless there are indications otherwise in the teleconference content. In this embodiment, the restricted classification can be a low, medium or high level. If any user with access rights lower than the restricted classification of any identified restricted content, then that content needs to be redacted from the content provided to that user at the user's location. This determination is made in step 555. If yes, there is restricted content to be redacted, then processing continues to step 560, otherwise processing continues to step 570.

In step 560, the redaction unit can then instruct the conversion unit of that content to redact the restricted information to the location where the user without appropriate access rights is located and receiving the teleconference content. Alternative embodiments could utilize a different unit from the conversion unit to redact the content as described herein. This redaction can include various redaction techniques such as muting of audio content, blacking out or making transparent video or multimedia content, etc. Such redaction may be performed to make the redaction hard to spot by a user without the necessary access rights, or make it obvious to spot by such a user. For example, assuming there is a short time delay in the audio feed, the muted word or words may be simply cut out of the buffered audio feed and then the time buffer renewed at the next pause within the audio feed. Then in step 565, the redacted content is provided back to the teleconference feed for replacing the content in the original teleconference feed and forwarded to the appropriate locations. Please note that multiple redacted feeds may be provided based on the access rights of the users at each location. As a result, each location can receive a different set of redacted content based on the users and their access rights at that location.

In step 570, the appropriate content in the teleconference feed, redacted or not, is forwarded to the appropriate locations to be provided to the authenticated users with the appropriate access rights to view that content. This process (steps 540-570) continues throughout the teleconference event until the teleconference is over. In addition, if user join or quit the teleconference, steps 500-530 may be repeated and the level of redaction and locations for redaction may be modified accordingly. This results in a teleconference feed that is content appropriate for each user. In addition, as the teleconference content and redacted teleconference content is provided to the appropriate authenticated users, the timestamp provided earlier can be compared to the current time to determine whether the process described herein is occurring in real-time. If not or if it is close, then additional computing resources can be allocated to the teleconference to provide a real-time experience to the attendees. A maximum delay for real-time can be user configured, typically from a 1 to 3 second delay. Finally, in step 575, the results of the teleconference, including which portions were redacted for which individual, are stored in a historical database such as historical information 430 for possible future analysis to improve the restricted content monitoring and redaction process. This step can also be performed concurrently with steps 540-570.

FIGS. 6A-6D provide block diagrams of data structures utilized for managing user access to restricted data in accordance with a second embodiment of the present disclosure. As described below, a subset or modified set of data structures may be utilized for the first embodiment. These data structures are shown as a set records which may be stored in databases such as in teleconferences databases 420. A record is a set of information within a domain or database that establishes a relationship between a set of data or data elements. A record may be a separate entry into a database, a set of links between data, or other logical relationship between a set of data.

FIG. 6A is a block diagram of a user record 600 which can be stored in a users database for identifying users accessing teleconference including their access rights and other relevant information about those users. Much of this information could be located in other databases within an organization with linkages to user record 600. A single record may be utilized for each user or for a set of users. Record 600 includes information about a user including a user identifier (ID) 602, a user name 604, a set of access rights 606 including an authorization (or restricted classification) level, an organization that the user belongs to 608, a position or level within that organization 610, and other relevant information 612 about that user depending on how a particular embodiment is implemented. User identifier 602 can include a password, biometric information about the user for facial recognition, and other information which can be utilized to authenticate the user. In alternative embodiments, organization, position/level and other relevant information may be incorporated as part of the user's access rights 606, but they are stored separately for illustrative purposes. In the first embodiment, elements 600-606 may be all that are needed for that implementation.

FIG. 6B includes block diagrams of a teleconference event type record 620 and a template record 630 which can be stored in a teleconference categories database. Type record 620 includes information about a type of teleconference event including a teleconference type identifier (ID) 622 for referencing a teleconference reservation in a reservation database, a brief description 624 of the type of teleconference for use in a user selecting a teleconference type (e.g., a presentation with remote queries, a collaborative session with multimedia, etc.), resources required for the type of teleconference event 626 (e.g., equipment needed at each location, processing resources needed for managing the teleconference including redaction of restricted content), and possible template identifiers (IDs) 628 that are suitable for a given teleconference type. Template record 630 includes information about a template including a template identifier (ID) 632, a brief description 634 of the template for use in a user selecting a template (e.g., a teleconference session directed at marketing discussions on current sales), an organization type 636, a restricted classification by position 638, any specific topics or categories of restricted classification 640, and any other relevant information for managing redaction of a teleconference 642. Examples of other relevant information 642 can include instructions on how to handle unauthorized attendees, whether any user can authorize another user to attend or to view restricted content, rules to apply when redacting restricted content such as whether to broadly redact and related information or to simply redact a given restricted word, etc. There can be simple templates made available that are across all organizations and only have a general restricted classification. However, many custom templates can be created that are specific to a given organization and may manage the restricted classification of content by organization 636 and position/level 638 or by other factors set forth in other relevant information 642. In the first embodiment, elements 622-624 of type record 620 may be all that are needed for that implementation.

FIG. 6C includes a block diagram of a reservation record 650 of a teleconference event which can be stored in a reservations database. Record 650 includes information about a teleconference event reservation including a date 652, a time 654, a list or category of authorized attendees 656, the type of teleconference 658, an associated template 660 for use in managing the redaction of restricted content, and other relevant information 662 which may be useful in maintaining a reservation including possible locations of the teleconference, etc. In the first embodiment, elements 652-658 and a general restricted classification of the schedule teleconference (in lieu of an associated template) may be all that are needed for that implementation.

FIG. 6D includes a block diagram of a restricted classification data record 670 which can be stored in a database of restricted classification data. Restricted data record 670 includes a list of items or categories of information 672 which can be deemed restricted (including confidential information) and which may be redacted for some users. Restricted data record 670 also includes a set of rules 674 such as for use in identifying restricted data. This can include directing the system to use a thesaurus for identifying synonyms and other similar items or categories which may also be deemed restricted. For example, one may not want to redact synonyms of an unannounced product name, but may want to redact synonyms of a restricted topic name, Examples of restricted information, some of which may be confidential, include customer names, unannounced product names, personally identifiable information such as social security or other identifier numbers, HIPPA (Health Insurance Portability and Accountability Act) information, GDPR (General Data Protection Regulation) restricted data, items identified as restricted or confidential in the teleconference, etc. Confidential data is restricted data which needs to be kept confidential for legal or business strategic purposes. In addition, the restricted classification of the data 676 is included to indicate how restricted the item or category of restricted is deemed. For example, the restricted data may be ranked low, medium or highly restricted, although alternative rankings or other measures of restricted classification may be utilized. Furthermore, non-restricted substitutions 678 may also be stored in the database for use in substituting for restricted data as part of a redaction process, such as described with reference to the second embodiment below. In addition to storing restricted data, records including a list or categories of information which are deemed not restricted (with restricted classification 676 set to zero or null) may also be included to provide examples of items or categories that are not to be redacted. Additional elements can be included in restricted classification data record 670 such as additional rules to apply when redacting restricted data such as whether to broadly redact any related information or to simply redact a given restricted word. Additional teleconference databases and records may be included or the described records may be organized differently in alternative implementations of the present invention.

Figure 7:
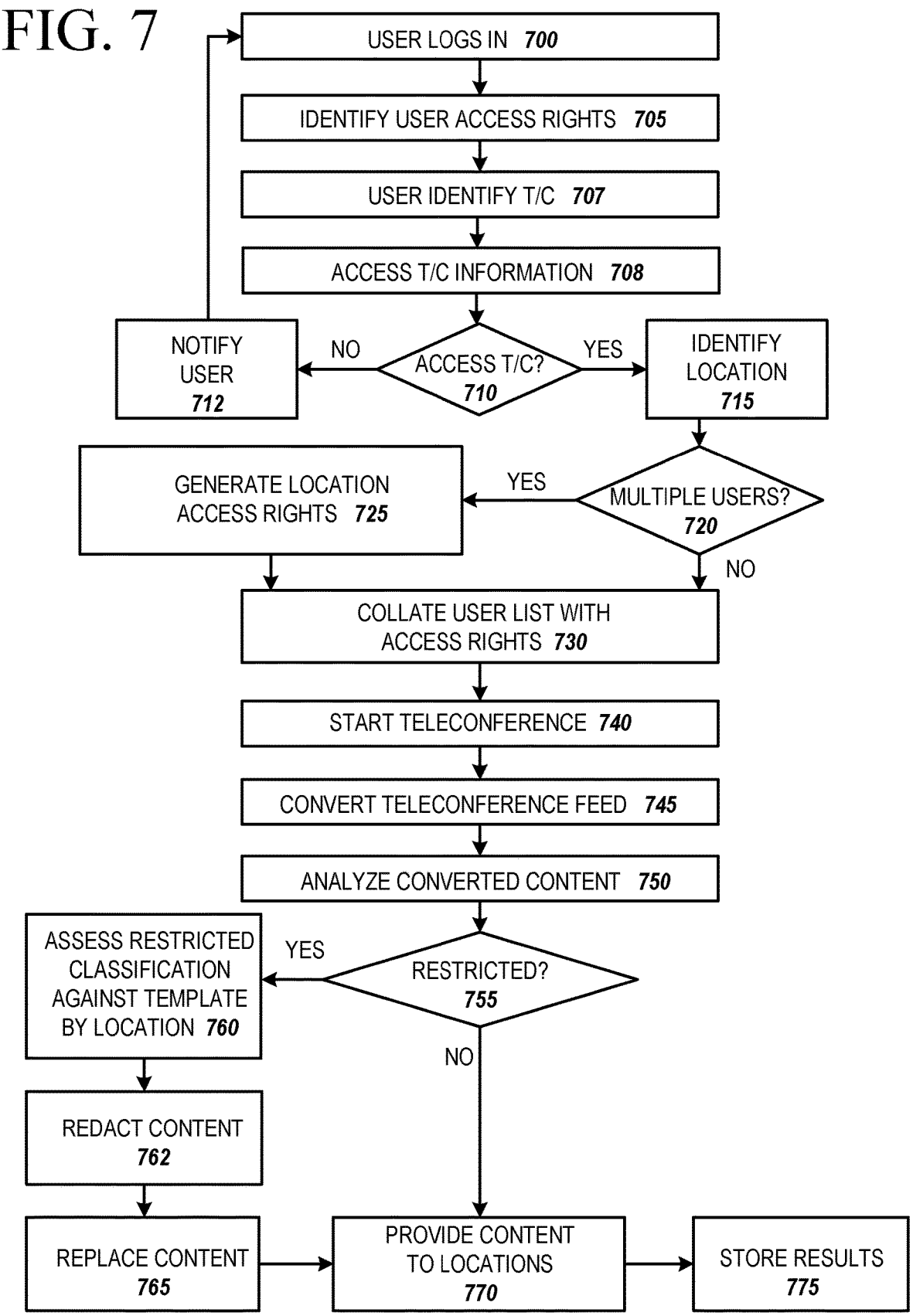
FIG. 7 provides a flow diagram of managing user access to restricted data through intelligent content redaction in accordance with the second embodiment of the present disclosure.

FIG. 7 provides a flow diagram of managing user access to restricted data through intelligent content redaction in accordance with the second embodiment of the present disclosure. In this second embodiment, a teleconference template may be utilized for more custom redaction of restricted content for users based on their access rights. This presumes the teleconference event had previously been scheduled/reserved or just been set up for multiple users to join such as described in FIG. 3A above. Such a reservation would include making sure that appropriate resources (e.g., from resources 626 of template record 620) were allocated to be able to timely redact restricted content of a live teleconference in real-time. In this embodiment, each user has a set of access rights as well as an organization position and other attributes that may be utilized in conjunction with a template in managing content redaction.

In a first step 700, a user logs onto a requested teleconference through a teleconference system such as teleconference management system 400 in communication with teleconference systems 402. That is, the user accesses the teleconference system and is authenticated as a user with that system. The teleconference system can be accessed through an app on a mobile device, a software application on a local server accessible through a local network, a webpage on an internet website, or other secure method for accessing the teleconference application. The user can be authenticated through the use of user identifier 602 including a password, through biometrics such as voice and/or facial recognition, through the sharing of digital certificates by a system or software the user already has authorized access to, from a teleconference event calendar request that identifies the user from a secure system, etc. Optionally, two step authentication may be utilized including sending a text or email to previously known phone number or email address to the user for entry by that user. Once a user accesses the teleconferencing system the user may logoff that system at any time in the process described below. The current state of the user's access, including any teleconference event the user is originating, may be retained for the next time the user logs onto the teleconferencing system. If the user is originating a teleconference, then that process can be implemented similar to FIG. 3A above, otherwise processing continues to step 705.

Then in step 705, the teleconferencing system identifies the access rights 606 (also referred to herein as credentials), organization 608 and position 610 as well as any other relevant information 612 that the user has with regards to originating and accessing teleconferences. Some users may have limited access rights, including organization and position, and may only access certain teleconference events or may have certain restricted content redacted from the teleconference content provided to that user. In step 707, the user then identifies which teleconference the user wishes to attend. This can be accomplished from a pull down menu of scheduled teleconferences about to start or which are ongoing such as from a reservations database including whether the user was on a list of possible attendees, from a link of a calendar invitation the user has received, etc. This information can be derived from a reservation record 650 including date 652, time 654, attendees 656, etc. Once selected, then in step 708 the type identifier 658 and associated template identifier 660 from reservation record 650 are utilized to obtain information about the teleconference including utilizing the type identifier 658 and template identifier 660 to obtain a referenced teleconference type record 620 and template record 630.

In step 710, a determination is made whether the user has the necessary credentials (i.e., access rights), organization and position to access the requested teleconference and associated template. For example, the user may be from a different organization (e.g., engineering rather than marketing), have a position with less access, or other factors such that the user may not be authorized to access the teleconference accordingly to the associated template (e.g., as set forth in other relevant information 642). However, if a user with a high level of access rights specifically invites the user with low access rights, this limitation may be overridden, depending on how the system is configured and implemented or as set forth in the template. If the user does not have the necessary access rights, then the user is notified of this fact in step 712 and processing returns to step 700. The user can then request access to the teleconference through other channels or attempt to log onto another teleconference. It is possible that the user simply attempted to log onto the wrong teleconference. If yes in step 710, the user has the necessary credentials to access the teleconference (abbreviated as T/C in the drawings), then processing proceeds to step 715.

In step 715, it is determined which location the user is accessing the teleconference. This can be a specific location such as a specific local teleconference room, or it can be a specific device such as a desktop computer or even a mobile device such as a cell phone. Then in step 720, it is determined whether any other persons are also accessing the teleconference from the same location. This can be accomplished through the log in process, or it can be determined through facial recognition of a video feed or even of voice recognition of an audio feed. If yes in step 720, then processing continues to step 725, otherwise to step 730. In step 725, the access rights of each user at that location, including organization and position, are compared and a working set of access rights are generated for all users at that location. As described above, typically the lowest access rights can be utilized as a default, although some users may have the necessary access rights to modify this approach. For example, one user at a given location may be from the organization set forth in the associated template and another user may not be from that organization, resulting in a reduced level of access at that location based on the factors set forth in the associated template. As a result, the working set of access rights for a location are utilized for redacting restricted content from the teleconference content as the teleconference proceeds. Processing then continues from step 725 to step 730. As described above, if no in step 720, then processing continues directly to step 730. In step 730, a list of participants by location is generated, supplemented or otherwise collated for the teleconference including the working access rights of each location where the teleconference content is generated and provided. Processing then continues to step 740. Steps 700-730 can be repeated for each user that logs onto the teleconference and can continue even after the teleconference starts in step 740.

In step 740, the teleconference starts with a teleconference feed (i.e., teleconference content in the form of audio, visual and multimedia form) from each location that provides content to the teleconference. For example, three teleconference locations may be included with two locations providing content and the third location simply receiving content but not providing any content. The various teleconference feeds can be continuously or periodically timestamped at this as the content is provided or otherwise captured. In step 745, the teleconference feed from each providing location is then converted for analysis by the teleconference redaction system, such as teleconference redaction system 440 described above. A redaction manager will split the teleconference feed from each providing location into one or more components for conversion to a useful form for determining whether any restricted content is included in that teleconference feed. For example, audio may be converted to metadata such as text through a natural language speech recognition system, a video may also be converted to identify and convert to metadata any written materials in that video feed, and multimedia may be converted to metadata through optical character recognition or other systems. Additional conversions may also be utilized such as song recognition, facial recognition, and other relevant conversions for identifying potentially restricted content such as that identified in restricted data database 428.

Then in step 750, the converted content is analyzed for restricted data according to a set of rules as described herein. That is, the converted split content is compared against a database of restricted data items and categories. This analysis can be conducted with a straight comparison of data against the database, or artificial intelligence or other simple or sophisticated matching analytical system may be utilized including the use of statistical and probability analysis. This matching system can be trainable over time to better recognize restricted content through various techniques such as reviewing prior redacted teleconferences in historical information database. This can include the identified restricted content as well as any related content identified as possibly restricted as well. Such a determination can utilize artificial intelligence, or other simple or sophisticated matching analytical system may be utilized including the use of statistical and probability analysis. In addition, if a person in the teleconference identifies content as restricted or highly restricted, or is a document or other multimedia item identifies content as restricted, then that is also treated as restricted content. Any identified restricted content is then checked for the restricted classification as previously identified such as in restricted data database 428. In the case of content identified as restricted within the teleconference feed, the restricted classification may also be discerned from the source or assumptions may be made based on how the system is configured. For example, the content identified as restricted within the teleconference feed may be automatically given a low level of restricted classification unless there are indications otherwise in the teleconference content. In this embodiment, the restricted classification can be low, medium or high. If any user with access rights lower than the restricted classification level of any identified restricted content, then that content needs to be redacted from the content provided to that user at the user's location. This determination is made in step 755. If yes, there is restricted content to be redacted, then processing continues to step 760, otherwise processing continues to step 770.

In step 760, an assessment is made between the restricted information and the user's access rights in accordance with the template associated with the teleconference. That is, the access rights 606, organization 608, position 610 and other relevant information 612 of users at each location is assessed against the associated template's organization 636, position based restricted classification 638, specific topics based restricted classification 640 and other relevant factors 642 and compared against the restricted classification 676 to determine whether the restricted information should be redacted from the content for certain locations (i.e., for the users at each location). This can include any surrounding or peripheral information provided in the audio, visual or multimedia content. This can also include a determination whether to substitute content 678 which may be identified in the restricted data record 670 as part of the redaction process.

In step 762, the redaction unit can then instruct the conversion unit of that content to redact the restricted information to the location where the user without appropriate access rights is located and receiving the teleconference content in accordance with the assessment in step 760 above. Alternative embodiments could utilize a different unit from the conversion unit to redact the content as described herein. This redaction can include various redaction techniques such as muting of audio content, blacking out or making transparent video or multimedia content, etc. Such redaction may be performed to make the redaction hard to spot by a user without the necessary access rights, or make it obvious to spot by such a user. For example, assuming there is a short time delay in the audio feed, the muted word or words may be simply cut out of the buffered audio feed and then the time buffer renewed at the next pause within the audio feed. In the case of substituted content for certain restricted content as per substitute 678 in restricted classification record 670, the same or different font as the original content may be utilized in visual or multimedia content or a substitute or simulated voice may be utilized for audio content. Then in step 765, the redacted content is provided back to the teleconference feed for replacing the content in the original teleconference feed and forwarded to the appropriate locations. Please note that multiple redacted feeds may be provided based on the access rights of the users at each location. As a result, each location can receive a different set of redacted content based on the users and their access rights at that location.

In step 770, the appropriate content in the teleconference feed, redacted or not, is forwarded to the appropriate locations to be provided to the authenticated users with the appropriate access rights to view that content. This process (steps 740-770) continues throughout the teleconference event until the teleconference is over. In addition, if user join or quit the teleconference, steps 700-730 may be repeated and the level of redaction and locations for redaction may be modified accordingly. This results in a teleconference feed that is content appropriate for each user. In addition, as the teleconference content and redacted teleconference content is provided to the appropriate authenticated users, the timestamp provided earlier can be compared to the current time to determine whether the process described herein is occurring in real-time. If not or if it is close, then additional computing resources can be allocated to the teleconference to provide a real-time experience to the attendees. A maximum delay for real-time can be user configured, typically from a 1 to 3 second delay. Finally, in step 775, the results of the teleconference, including which portions were redacted for which individual, are stored in a historical database such as historical information 430 for possible future analysis to improve the restricted content monitoring and redaction process. This step can also be performed concurrently with steps 740-770.

This redaction process described herein can be performed in accordance with several sets of rules as described herein. There can be a set of rules for each item of restricted data describing whether to look for synonyms, misspellings, etc. such as in a database of restricted data. There can be a set of rules of how broadly content is redacted, such as for just the identified restricted data or for surrounding content. There can be a set of rules on how the data is redacted, such as whether to make the redaction obvious or not, whether to mask the mouth of a person speaking a restricted word, etc. which can be in a template. There can be a set of rules on which users have the necessary access rights to access restricted data, how to handle the access rights of multiple individuals in the same location, etc. Rules can be utilized on allocating computing resources needed to provide a real-time experience to the teleconference users and to modify that as needed during a live teleconference. These and additional rules can be user configured, can be improved by the analysis of historical data, and can be modified through the use of an artificial intelligence system. It is through these rules that this content redaction system can be a powerful and flexible system with intelligence.

Figure 8:
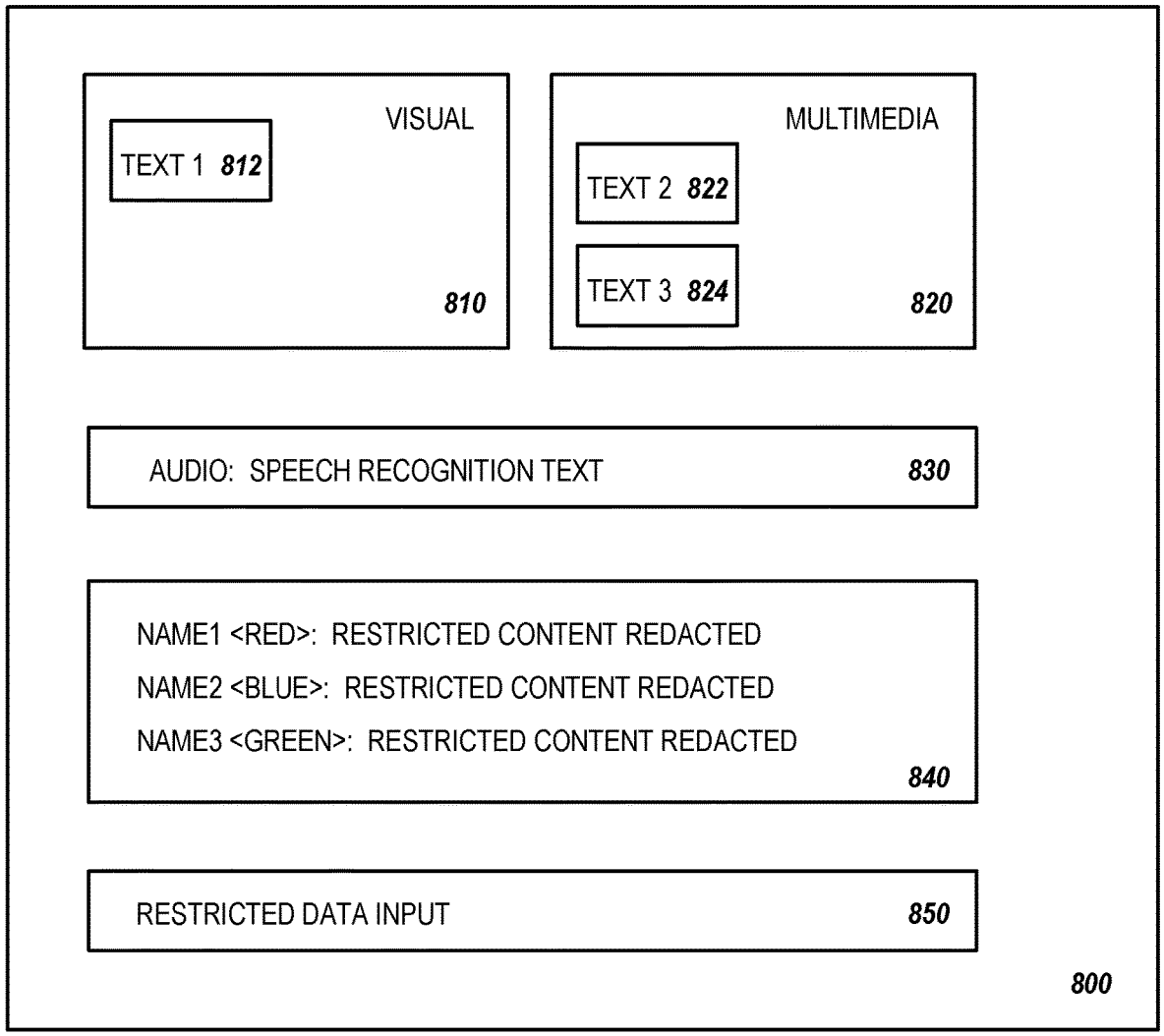
FIG. 8 provides a graphical user interface for a user to identify restricted content in a live teleconference feed in which various embodiments of the present disclosure may be implemented.

FIG. 8 provides a graphical user interface (GUI) for a user to identify restricted content in a live teleconference feed in which various embodiments of the present disclosure may be implemented. This GUI allows an authorized user to view which content is being redacted for which attendees and also allows the authorized user to identify content for redaction as the teleconference proceeds.

Graphical user interface (GUI) 800, which can be displayed on a monitor accessible by the originating or other authorized user as indicated in the associated teleconference template or in the teleconference reservation. GUI could be generated based on the original content and the redacted content as described below. GUI 800 includes a visual content 810, a multimedia content 820, an audio content converted to human readable text 830, a redaction feed by user or location 840, and a restricted data input 850 in this embodiment.

Visual content 810 can include a video feed from a location in the teleconference. Multiple video feeds can be displayed with multiple locations. Each video feed can include content subject to redaction such as text, photos, faces, etc. 812. Each video feed can include the original content with any redacted content highlighted in a color based on the redaction for one or more users or locations. The color utilized for indicating a given user or location is described below.

Multimedia content can include a multimedia feed or presentation provided for the teleconference. Multiple multimedia feeds can be displayed with one or more locations. Each multimedia feed can include content subject to redaction such as text, photos, faces, etc. 822 and 824. Each multimedia feed can include the original content with any redacted content highlighted in a color based on the redaction for one or more users or locations. The color utilized for indicating a given user or location is described below.

Audio content 830 can include metadata such as human readable text generated by a speech recognition system from an audio feed or presentation provided for the teleconference. Multiple audio feeds can be displayed with one or more locations. Each audio feed can include content subject to redaction such as certain words, songs, etc. Each audio feed can include the original content translated to text with any redacted content highlighted in a color based on the redaction for one or more users or locations. The color utilized for indicating a given user or location is described below.

Redaction content box 840 includes a listing of restricted content redacted. The listing can be provided by user name (obtained from user record 600 as name 604), by location, by restricted classification, or other desired category. A color is indicated with each listing line to indicate which content is redacted in the audio, video and multimedia content as described above. In addition, each listing line includes the content redacted for that line, which can be displayed briefly when that restricted content is being redacted for that listing. Restricted data input box 850 is also provided which allows the authorized user to view and to type in or otherwise input content desired to be kept restricted and redacted from selected users. This can include new items not in the database of restricted data such as a new unannounced product under development (e.g., aardvark). The authorized user may also type in or select the restricted classification in this input box (e.g., highly restricted: aardvark). There are other methods an authorized user may indicate that certain content is restricted and should be redacted during a live ongoing teleconference in real-time. The authorized user can just state so in the teleconference by identifying the restricted content. By stating the restricted classification first, the restricted content can be redacted immediately thereafter, thereby having that content immediately redacted and not provided to unauthorized users (e.g., "content with medium restricted classification . . . aardvark"). The authorized user can also simply state that the following content will be considered of medium restricted classification for the next amount of time or until a code word is provided ending that period of restricted classification. Many other alternative embodiments could be implemented to allow an authorized user to view which restricted content is being redacted and to allow that authorized user to input content to be treated as restricted for immediate redaction during the teleconference.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction processing device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may be processed entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may process the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which are processed on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more performable instructions for implementing the specified logical function(s). In some alternative implementations, the functions noted in the blocks may occur out of the order noted in the Figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A data processing system suitable for storing and/or processing program code will include at least one processor coupled directly or indirectly to memory elements through a system bus. The memory elements can include local memory employed during actual processing of the program code, bulk storage media, and cache memories, which provide temporary storage of at least some program code in order to reduce the number of times code must be retrieved from bulk storage media during processing.

A data processing system may act as a server data processing system or a client data processing system. Server and client data processing systems may include data storage media that are computer usable, such as being computer readable. A data storage medium associated with a server data processing system may contain computer usable code such as for managing user access to restricted data through intelligent content redaction. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of managing user access to restricted data comprising:
    authenticating, by one or more processors, a set of users requesting attendance to a teleconference;
    obtaining, by the one or more processors, a level of content access rights associated with each of the authenticated users with regards to originating and accessing content of the teleconference;
    receiving, by the one or more processors, a live feed of the content from the teleconference;
    converting, by the one or more processors, the live feed of content from the teleconference to a form of metadata in real-time;
    comparing, by the one or more processors, the metadata from the teleconference to a database of restricted data to identify restricted data in real-time;
    responsive to identifying the restricted data, determining, by the one or more processors, whether each authenticated user of the set of authenticated users has the level of content access rights to receive the restricted data;
    responsive to determining at least one authenticated user does not have the level of content access rights to receive the restricted data, redacting, by the one or more processors, the restricted data from the teleconference content by one or more redaction techniques to generate a redacted teleconference content in real-time; and
    providing, by the one or more processors, the teleconference content to each authenticated user with the level of content access rights to receive the restricted data in real-time, and providing the redacted teleconference content to each authenticated user without the level of content access rights to receive the restricted data in real-time.

2. The method of claim 1, wherein the live feed of content from the teleconference includes an audio content, a video content, and a multimedia content, and the redacted teleconference content includes a redacted audio content, a redacted video content and a redacted multimedia content.

3. The method of claim 2, wherein converting the live feed of content from the teleconference to the form of metadata in real-time further comprises:
    converting, by the one or more processors, the audio content to text utilizing a speech recognition system;
    converting, by the one or more processors, the video content to text utilizing an optical character recognition system; and
    converting, by the one or more processors, the multimedia content to text utilizing an optical and content recognition system.

4. The method of claim 1, wherein a subset of the users are requesting attendance to the teleconference at a common location, further comprising comparing the access rights of the subset of users to generate a common set of access rights; and utilizing the common set of access rights for determining whether the teleconference content should be redacted for the subset of users at the common location.

5. The method of claim 1, further comprising:
    prior to converting the live feed of content from teleconference, timestamping, by the one or more processors, the teleconference content;
    comparing, by the one or more processors, the timestamp to a current time when the teleconference content and redacted teleconference content is provided in real-time to each authenticated user to determine a time lag; and
    upon determining that the time lag exceeds a predetermined maximum, modifying, by the one or more processors, the processing resources utilized for converting, reviewing, redacting and providing the teleconference content and redacted teleconference content to each of the authenticated users.

6. The method of claim 1, wherein the level of content access rights associated with each of the authenticated users with regards to originating and accessing content of the teleconference include a low level of restriction, a medium level of restriction, and a high level of restriction.

7. The method of claim 1, further comprising:
    subsequent to obtaining the level of content access rights associated with each of the authenticated users with regards to originating and accessing the teleconference, enabling, by the one or more processors, an originating user to identify a type of teleconference for the teleconference; and enabling, by the one or more processors, the originating user to categorize the teleconference in a level of restricted classification, wherein the levels of restricted classification include a low level of restricted classification, a medium level of restricted classification, and a high level of restricted classification.

8. The method of claim 7, wherein determining whether each authenticated user of the set of authenticated users has the level of content access rights to receive the restricted data further comprises:

comparing, by the one or more processors, the level of restriction classification of the restricted data to the level of restricted classification of the teleconference; and comparing, by the one or more processors, the level of restriction classification of the restricted data to the level of content access rights of each authenticated user of the set of authenticated users.

9. The method of claim 1, wherein the database of restricted data includes a list of items and one or more categories of information deemed restricted, wherein the list of items and the one or more categories of information include a name of a customer, a set of personally identifiable information of the customer, a set of identifying numbers of the customer, Health Insurance Portability and Accountability Act information, General Data Protection Regulation restricted data, a name of an unannounced product, an item identified as restricted in the teleconference, and an item identified as confidential in the teleconference.

10. The method of claim 1, further comprising:

subsequent to comparing the metadata from the teleconference to the database of restricted data to identify the restricted data in real-time, identifying, by the one or more processors, a restricted data within the metadata from the teleconference;

identifying, by the one or more processors, metadata from the teleconference related to or proximate to the restricted data; and assigning, by the one or more processors, an appropriate level of restriction classification to the restricted data and the metadata from the teleconference related to or proximate to the restricted data, wherein the level of restriction classifications is a low level restricted classification, a medium level restricted classification, or a high level restricted classification.

11. The method of claim 1, wherein the one or more redaction techniques to generate a redacted teleconference content include muting of the audio content, blacking out of the video content, blacking out of the multimedia content, making transparent the video content, making transparent the multimedia content, and masking of a mouth area of a speaker.

12. A computer program product for managing user access to restricted data, the computer program product comprising a computer readable storage medium having program instructions embodied therewith, the program instructions processed by a processing circuit perform a method comprising:

authenticating a set of users requesting attendance to a teleconference;

obtaining a level of content access rights associated with each of the authenticated users with regards to originating and accessing content of the teleconference;

receiving a live feed of the content from the teleconference;

converting the live feed of content from the teleconference to a form of metadata in real-time;

comparing the metadata from the teleconference to a database of restricted data to identify restricted data in real-time;

responsive to identifying the restricted data, determining whether each authenticated user of the set of authenticated users has the level of content access rights to receive the restricted data;

responsive to determining at least one authenticated user does not have the level of content access rights to receive the restricted data, redacting the restricted data from the teleconference content by one or more redaction techniques to generate a redacted teleconference content in real-time; and providing the teleconference content to each authenticated user with the level of content access rights to receive the restricted data in real-time, and providing the redacted teleconference content to each authenticated user without the level of content access rights to receive the restricted data in real-time.

13. The computer program product of claim 12, wherein the live feed of content from the teleconference includes an audio content, a video content, and a multimedia content, and the redacted teleconference content includes a redacted audio content, a redacted video content, and a redacted multimedia content.

14. The computer program product of claim 13, wherein converting the live feed of content from the teleconference to the form of metadata in real-time further comprises:

converting the audio content to text utilizing a speech recognition system;

converting the video content to text utilizing an optical character recognition system; and converting the multimedia content to text utilizing an optical and content recognition system.

15. The computer program product of claim 12, wherein a subset of the users are requesting attendance to the teleconference at a common location, further comprising comparing the access rights of the subset of users to generate a common set of access rights; and utilizing the common set of access rights for determining whether the teleconference content should be redacted for the subset of users at the common location.

16. The computer program product of claim 12, further comprising:

prior to converting the live feed of content from teleconference, timestamping the teleconference content;

comparing the timestamp to a current time when the teleconference content and redacted teleconference content is provided in real-time to each authenticated user to determine a time lag; and upon determining that the time lag exceeds a predetermined maximum, modifying the processing resources utilized for converting, reviewing, redacting and providing the teleconference content and redacted teleconference content to each of the authenticated users.

17. A data processing system for managing user access to restricted data, the data processing system comprising:

a processor; and a memory storing program instructions which when processed by the processor perform the steps of:

authenticating a set of users requesting attendance to a teleconference;

obtaining a level of content access rights associated with each of the authenticated users with regards to originating and accessing content of the teleconference;

receiving a live feed of the content from the teleconference;

converting the live feed of content from the teleconference to a form of metadata in real-time;

comparing the metadata from the teleconference to a database of restricted data to identify restricted data in real-time;

responsive to identifying the restricted data, determining whether each authenticated user of the set of authenticated users has the level of content access rights to receive the restricted data;

responsive to determining at least one authenticated user does not have the level of content access rights to receive the restricted data, redacting the restricted data from the teleconference content by one or more redaction techniques to generate a redacted teleconference content in real-time; and providing the teleconference content to each authenticated user with the level of content access rights to receive the restricted data in real-time, and providing the redacted teleconference content to each authenticated user without the level of content access rights to receive the restricted data in real-time.

18. The data processing system of claim 17, wherein the live feed of content from the teleconference includes an audio content, a video content, and a multimedia content, and the redacted teleconference includes a redacted audio content, a redacted video content, and a redacted multimedia content.

19. The data processing system of claim 18, wherein converting the live feed of content from the teleconference to the form of metadata in real-time further comprises:

converting the audio content to text utilizing a speech recognition system;

converting the video content to text utilizing an optical character recognition system; and converting the multimedia content to text utilizing an optical and content recognition system.

20. The data processing system of claim 17, further comprising:

prior to converting the live feed of content from teleconference, timestamping the teleconference content;

comparing the timestamp to a current time when the teleconference content and redacted teleconference content is provided in real-time to each authenticated user to determine a time lag; and upon determining that the time lag exceeds a predetermined maximum, modifying the processing resources utilized for converting, reviewing, redacting and providing the teleconference content and redacted teleconference content to each of the authenticated users.

* * * * *